222. DISPENSING.
455
Patented June 21, 1938

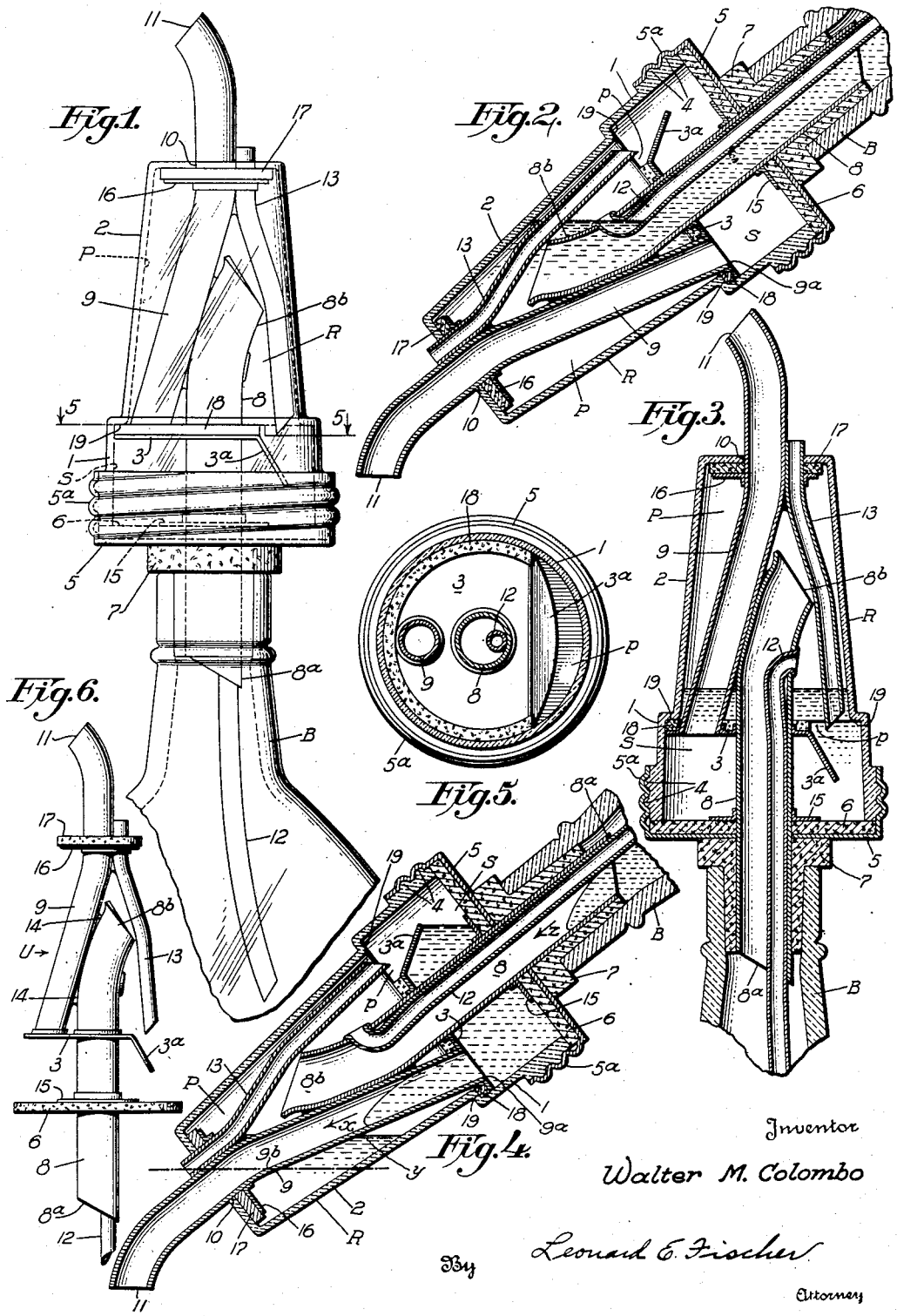

2,121,424

UNITED STATES PATENT OFFICE 2,121,424

LIQUID MEASURING AND DISPENSING DEVICE

Walter M. Colombo, Springfield, N. J.

Application September 3, 1937, Serial No. 162,268

7 Claims. (Cl. 221—147)

This invention relates to dispensers and more particularly to dispensers of that type which are adapted to be attached to a bottle or other container and which functions to deliver a predetermined quantity of liquid each time the container is tipped.

Many dispensers of this nature heretofore have been proposed, but, insofar as I am aware, none has been entirely practical and satisfactory under all conditions of operation. Of the devices heretofore proposed some have been extremely complicated in construction and therefore unduly expensive to manufacture. Others have been so designed that they are difficult, if not impossible, to thoroughly clean. Still others, while operative under certain conditions, such for example as when the container is comparatively full, will not always function accurately when the container is only half full or less.

The present invention has for an object to provide an improved predetermined quantity dispenser of this type which is simple in construction and therefore inexpensive to manufacture; which is devoid of valves; which readily may be assembled and as readily disassembled for thorough cleaning; and which will function, at each tipping of the container, to deliver a predetermined quantity of liquid until the container has been completely emptied.

A preferred embodiment of the invention consists in the novel features of construction and the arrangement and combination of parts hereinafter described in connection with the accompanying drawing, in which:—

Fig. 1 is a side elevation of the improved dispenser showing it applied to a bottle, a portion of which is broken away.

Fig. 2 is a longitudinal section of the device showing it tipped for initial loading of the receiving chamber.

Fig. 3 is a view similar to Fig. 2 but showing the device in upright position with the major portion of that initial charge of liquid transferred to the measuring or delivery chamber.

Fig. 4 is a view similar to Fig. 2 showing the delivery chamber being emptied and the receiving chamber reloaded.

Fig. 5 is a horizontal section taken substantially on the line 5—5 of Fig. 1.

Fig. 6 is a detail view of a unit comprising a filler conduit, a discharge conduit and suitable vent pipes, adapted to be inserted bodily in the casing of the device, as hereinafter will be explained.

Referring more specifically to the drawing the invention is disclosed as embodied in a dispenser comprising a receptacle R, preferably of glass, adapted to be attached to the mouth of a bottle B or other container. The receptacle R is formed with a cylindrical base portion 1 and a tapered upper portion 2. Within the receptacle R between portions 1 and 2 there is arranged an interrupted horizontally disposed partition 3 which divides the receptacle into an upper or primary loading chamber P and a lower or secondary measuring chamber S.

The base is formed on its outer surface with screw threads 4 adapted to receive the correspondingly threaded skirt portion 5ª of a cap 5 adapted to close the lower open end of the receptacle through the medium of a cork gasket 6 inserted therebetween.

Arranged within the mouth of the bottle B is a hollow cork stopper 7 within which is snugly fitted a tube 8 forming one element of the unit U shown in Fig. 6. This tube has its lower open end 8ª projecting into the neck of the bottle. From there it extends upwardly coaxially through the chamber S, through the partition 3 and terminates in an open end 8ᵇ within the primary or loading chamber P. The tube 8 constitutes a filler conduit for the receptacle R, as later will be explained. The unit U also comprises a tube 9 which serves as a discharge conduit for the secondary or measuring compartment S. This tube connects with the chamber S at one side thereof and eccentric to the axis of the receptacle R. From that point the tube extends upwardly through the chamber P and emerges through an aperture 10 coaxial with the receptacle R. This inclination of the delivery tube 9 forms an important feature of this invention, as later will appear. The upper end of the tube 9 is curved and constitutes a spout 11 from which to pour the contents of the chamber S.

Mounted within the tube 8 and extending into the bottle is a vent tube 12 which admits air into the bottle from the chamber P to permit liquid to be poured from the bottle. The unit U also comprises a second vent tube 13, secured to the tube 9, which admits air from the atmosphere to the chamber S to permit emptying of that chamber as later will be explained. The tubes 8 and 9 are fixedly secured in the partition 3 and are permanently fastened together as at 14. Thus the partition 3 forms a part of the unit U as do also a collar 15 secured to the tube 8 and a collar 16 secured to the tubes 9 and 13.

The partition 3 is formed with a down-turned portion 3ª which is spaced from the annular wall of the base portion thereby affording a connecting port *p* between the compartments P and S. This down-turned portion also serves as a splash plate or baffle to prevent the liquid in the chamber S from being thrown forwardly into the chamber P when the device is tipped.

As hereinbefore stated one of the objects of this invention is to provide a construction which readily may be assembled and which also may readily be disassembled for the purpose of cleaning, etc. This is attained by the construction and arrangement of parts as will now be explained. The unit U having been provided and the parts thereof permanently secured together as by welding or soldering, it readily may be inserted into or removed from the receptacle with no difficulty. The assembly of the device is accomplished as follows:—With the unit constructed as shown in Fig. 6 and with a cork gasket 17 placed thereon above the collar 16, and with a C-shaped cork gasket 18 (see Fig. 5) placed upon the upper side of the partition 3 the unit U is inserted within the receptacle R and the upper ends of the delivery tube 9 and the vent tube 13 projected through the aperture 10 in the top wall of the receptacle. The threaded cap 5 with the cork gasket 6 inserted therein is then slipped over the tube 8 and screwed onto the threaded portion 4 of the base 1. Tightening of the cap will, through the contact of the gasket 6 with the collar 15, force the unit upwardly and, at the same time draw downwardly on the receptacle R. This will cause the gasket 17 to be tightly gripped between the collar 16 and the top wall of the receptacle. It will also cause the partition 3 to be forced upwardly into tight contact with the gasket 18, which is then seated against the underside of an annular shoulder 19 formed at the juncture of the portions 1 and 2 of the receptacle. This same tightening of the cap also causes lower edge of the base portion 2 to be tightly compressed upon the gasket 6. Thus by this single operation the entire device is assembled and rendered watertight. Obviously the device may be disassembled merely by unscrewing the cap and withdrawing the unit U.

*Operation*

The operation of the device is as follows:— With the device attached to a container B, as shown in Fig. 1, and with a quantity of liquid in the container, the container and dispenser are tipped to the position shown in Fig. 2. Liquid from the container runs down tube 8 into compartment P. At the same time air from compartment P flows through vent tube 12 into the container to displace the liquid therein. When the liquid has filled the compartment P to a point where, as shown in Fig. 2, it cuts off the vent 12 no more liquid will flow from the container. Next the container and receptacle are returned to the upright position illustrated in Fig. 3. The major portion of the liquid in the chamber P then flows downwardly through port *p* into the measuring or delivery chamber S. The parts are so proportioned that there is always an excess of liquid which remains in the chamber P. The operation just described is merely a loading operation and prepares the device for delivering a predetermined quantity at each subsequent tipping operation.

The device having been loaded, the container and the dispenser attached thereto are again tipped as shown in Fig. 4. At the beginning of this movement the liquid in the compartment S starts to flow outwardly through the tube 9, as indicated by the arrow *x*, the excess liquid which was above the partition gravitates to the upper portion of the chamber P as indicated at *y* and a new charge of liquid starts to flow downwardly through the tube 8 from the container, as indicated by the arrow *z*. The measured charge in the compartment S will then be dispensed and the compartment P simultaneously refilled to the position shown in Fig. 2. Thus each tipping, after the first, will pour out a predetermined quantity and reload the compartment P for the succeeding operation.

As hereinbefore stated one of the important features of this invention is the inclination of the tube 9 in the compartment P. Due to this inclination it is necessary, in order to completely empty the chamber S, to raise the lower portion of the intake end 9ª of the delivery tube 9 to a point above horizontal line intersecting the tube 9 at 9ᵇ. This necessitates tipping of the container so that its axis is at a substantial angle above the horizontal and therefore insures that the chamber P will be refilled even when only a small quantity of liquid remains in the container.

In prior devices in which the discharge tube was arranged parallel to the loading tube the measuring chamber could be completely emptied by holding the container horizontal. When the container was half full or less this position would not cause the primary compartment to be filled to the desired level and therefore the next subsequent tipping of the container would not deliver the intended quantity.

Having thus described my invention what I claim is:—

1. In a device of the class described, a one-piece receptacle adapted to be connected with a container, said receptacle affording primary and secondary compartments in communication; a filler conduit arranged coaxially with said receptacle and adapted to connect said primary compartment with said container, said filler conduit extending into said primary compartment to a point approximately midway of its length; a discharge conduit having one end connected with said secondary compartment at one side of the axis of said filler conduit and its other end emerging from said receptacle in substantial alignment with the axis of said filler conduit; and vent means permitting alternate filling and emptying of said compartments.

2. A dispenser adapted to deliver predetermined quantities of liquid comprising a one-piece receptacle adapted to be connected with a container to receive liquid therefrom; a partition dividing said receptacle horizontally into two compartments; a port connecting said compartments; a filler tube connecting said container with the upper half of the upper one of said compartments; a discharge tube connected with the lower of said compartments at one side of said filler tube, said discharge tube extending diagonally through said upper compartment and emerging from said receptacle substantially in line with said filler tube; and vent means permitting filling and emptying of said compartments.

3. A dispenser for containers comprising a receptacle having an upper relatively large capacity chamber and a lower smaller capacity chamber; a partition separating said chambers; a port through said partition connecting said chambers; a baffle provided by said partition partially closing said port; a cap threaded upon the bottom portion of said receptacle and substantially closing the same; a filler tube extending from said upper chamber through said partition and cap into the container; a delivery tube extending from said lower chamber through said partition and emerging from said receptacle substantially concentrically thereof; a vent means connecting said upper chamber with said container; and other vent means connecting the lower chamber with the atmosphere.

4. A dispenser adapted to deliver predetermined quantities of liquid, comprising a receptacle adapted to be attached to a container, said receptacle being in the nature of an inverted cup and formed with an open lower end and a substantially closed upper end provided with an aperture, an annular shoulder in said receptacle intermediate its ends, a partition supported by said shoulder and dividing said receptacle into primary and secondary chambers, filler and discharge tubes located mainly in said receptacle and having ends extending into the container and through the aperture in said receptacle respectively; and a cap threaded upon the open end of said receptacle and maintaining said tubes in their operative positions.

5. A dispenser adapted to deliver measured quantities of liquid from a container comprising a receptacle adapted to be attached to the container, said receptacle being formed with an internal annular flange; a unit insertable into said receptacle and comprising filler and discharge tubes, having ends projecting from opposite ends of said receptacle, a partition carried by said tubes and adapted to be positioned within said receptacle intermediate its ends to divide the receptacle into primary and secondary compartments, a vent tube attached to each of said tubes for admitting air into said container and secondary compartment, respectively, a gasket between said partition and said flange; a first collar secured to said filler tube at one side of said partition, and a second collar secured to said discharge tube at the other side of said partition; a cap threaded upon the lower end of said receptacle; a gasket within said cap adapted to engage said first collar and the lower end of said receptacle; and a gasket between said second collar and the upper end of said receptacle, said cap serving to clamp said unit securely in said receptacle.

6. A unit for measured quantity dispensers comprising a filler tube adapted to have one end inserted coaxially within a container; a partition secured to said tube; a delivery tube connected with said partition at one side of said filler tube, said delivery tube extending upwardly at an angle to said filler tube and having a portion arranged in alignment therewith; a collar secured to said filler tube below said partition; a collar secured to that portion of the delivery tube in alignment with said filler tube; a vent pipe having one end secured to the last named collar and its other end terminating at one side of said delivery tube adjacent said partition; and a second vent tube located within the filler tube and having one end emerge therefrom above said partition.

7. A dispenser of the class described comprising a receptacle; means to attach said receptacle to a container; a unit insertable bodily within said receptacle and having a portion adapted to divide said receptacle into primary and secondary compartments, said unit also affording a filler tube extending into the container and connected with the primary compartment, a delivery tube having one end connected with said secondary compartment and its other end projecting from the upper end of said receptacle; and a cap threaded upon the lower end of said receptacle and adapted to maintain said unit in fixed position in said receptacle.

WALTER M. COLOMBO.